United States Patent
Ye et al.

(10) Patent No.: US 10,063,337 B1
(45) Date of Patent: Aug. 28, 2018

(54) ARRAYED WAVEGUIDE GRATING BASED MULTI-CORE AND MULTI-WAVELENGTH SHORT-RANGE INTERCONNECTION NETWORK

(71) Applicant: Shanghai Jiao Tong University, Shanghai (CN)

(72) Inventors: Tong Ye, Shanghai (CN); Kui Chen, Shanghai (CN); Hao He, Shanghai (CN); Weisheng Hu, Shanghai (CN)

(73) Assignee: Shanghai Jiao Tong University, Shanhai (CN)

( * ) Notice: Subject to any disclaimer, the term of this patent is extended or adjusted under 35 U.S.C. 154(b) by 0 days.

(21) Appl. No.: 15/876,083

(22) Filed: Jan. 19, 2018

(30) Foreign Application Priority Data

Nov. 1, 2017 (CN) .......................... 2017 1 1054631

(51) Int. Cl.
  *H04J 14/04* (2006.01)
  *H04J 14/02* (2006.01)
  (Continued)

(52) U.S. Cl.
  CPC ...... *H04J 14/0209* (2013.01); *H04Q 11/0005* (2013.01); *H04Q 11/0062* (2013.01);
  (Continued)

(58) Field of Classification Search
  CPC .. H04J 14/0209; H04J 14/04; H04Q 11/0005; H04Q 11/0062; H04Q 2011/0016;
  (Continued)

(56) References Cited

U.S. PATENT DOCUMENTS 5,870,216 A * 2/1999 Brock ................ H04B 7/18504
398/121
6,829,401 B2 * 12/2004 Duelk ................ H04Q 11/0005
385/16

(Continued)

*Primary Examiner* — Ken N Vanderpuye
*Assistant Examiner* — Dibson Sanchez
(74) *Attorney, Agent, or Firm* — Mei & Mark LLP; Manni Li

(57) ABSTRACT

An arrayed waveguide grating (AWG) based multi-core and multi-wavelength interconnection network, comprising N upper-level switches, N lower-level switches, and a network intermediate stage, with each upper- and lower-level switches has N CWDM optical transceiving modules. The N optical transceiving modules of each upper-level switch is connected with n m×1 multi-core optical multiplexing modules, the N optical transceiving modules of each lower-level switch is connected with n 1×m multi-core demultiplexing modules, the network intermediate stage is comprised of $n^2$ r×r multi-core and multi-wavelength wiring modules. The upper-level multi-core optical multiplexing modules, the lower-level multi-core demultiplexing modules, and the $n^2$ r×r multi-core and multi-wavelength wiring modules of the network intermediate stage are connected via an m-core MPO-MPO optical fiber jumper. The wiring complexity of the interconnection network is $O(N^2/r)$, with employment of a wavelength set of $\Lambda=\{\lambda_0, \ldots, \lambda_{k-1}\}$. The present invention conserves wavelength resources of communication windows, enhances scalability of the AWG based interconnection network, while reduces network wiring complexity.

3 Claims, 6 Drawing Sheets

(51) Int. Cl.
*H04Q 11/00* (2006.01)
*H04B 10/2581* (2013.01)
(52) U.S. Cl.
CPC ........... *H04B 10/2581* (2013.01); *H04J 14/04* (2013.01); *H04Q 2011/0016* (2013.01); *H04Q 2011/0032* (2013.01); *H04Q 2011/0049* (2013.01); *H04Q 2011/0077* (2013.01)
(58) Field of Classification Search
CPC ... H04Q 2011/0032; H04Q 2011/0049; H04Q 2011/0077; H04B 10/2581
USPC .................................................. 398/43–103
See application file for complete search history.

(56) References Cited

U.S. PATENT DOCUMENTS

| | | | | |
|---|---|---|---|---|
| 7,327,914 | B1* | 2/2008 | Kahn | G02B 6/4206 385/15 |
| 9,294,146 | B2* | 3/2016 | Mumtaz | H04B 10/2581 |
| 9,401,774 | B1* | 7/2016 | Mineo | H04J 14/0227 |
| 9,496,979 | B2* | 11/2016 | Sato | H04Q 11/0005 |
| 9,497,517 | B2* | 11/2016 | Lea | H04Q 11/0005 |
| 9,648,401 | B2* | 5/2017 | Yan | H04Q 11/0005 |
| 9,712,242 | B2* | 7/2017 | Rapp | H04B 10/27 |
| 9,794,657 | B1* | 10/2017 | Jiang | H04J 14/0212 |
| 9,854,337 | B1* | 12/2017 | Ye | H04Q 11/0005 |
| 9,967,208 | B2* | 5/2018 | Rickman | H04L 49/10 |
| 2005/0063703 | A1* | 3/2005 | Lee | H04Q 11/0005 398/49 |
| 2006/0051094 | A1* | 3/2006 | Moriwaki | H04J 14/0209 398/84 |
| 2006/0153496 | A1* | 7/2006 | Tanobe | H04J 14/0227 385/24 |
| 2007/0092248 | A1* | 4/2007 | Jennen | H04J 14/021 398/45 |
| 2008/0247387 | A1* | 10/2008 | Neilson | H04Q 11/0005 370/386 |
| 2009/0324243 | A1* | 12/2009 | Neilson | H04Q 11/0005 398/154 |
| 2010/0054741 | A1* | 3/2010 | Urino | H04J 14/02 398/79 |
| 2010/0329670 | A1* | 12/2010 | Essiambre | H04B 10/2581 398/43 |
| 2011/0243574 | A1* | 10/2011 | Essiambre | G02B 6/29311 398/200 |
| 2011/0274435 | A1* | 11/2011 | Fini | G02B 6/02042 398/139 |
| 2012/0177365 | A1* | 7/2012 | Winzer | H04B 10/2581 398/26 |
| 2012/0177384 | A1* | 7/2012 | Ryf | H04B 10/2581 398/202 |
| 2012/0224861 | A1* | 9/2012 | Winzer | G02B 6/14 398/143 |
| 2013/0136404 | A1* | 5/2013 | Feuer | G02B 6/02042 385/124 |
| 2013/0148963 | A1* | 6/2013 | Cvijetic | H04J 14/04 398/45 |
| 2013/0209106 | A1* | 8/2013 | Mukasa | H04J 14/02 398/79 |
| 2014/0056371 | A1* | 2/2014 | Ji | H04L 27/2697 375/260 |
| 2014/0079353 | A1* | 3/2014 | Fontaine | G02B 6/28 385/14 |
| 2014/0126915 | A1* | 5/2014 | Gruner-Nielsen | H04B 10/2581 398/143 |
| 2014/0140694 | A1* | 5/2014 | Zhou | H04J 14/04 398/44 |
| 2014/0199066 | A1* | 7/2014 | Martelli | H04B 10/2581 398/44 |
| 2014/0255022 | A1* | 9/2014 | Zhong | H04Q 11/0005 398/16 |
| 2014/0286648 | A1* | 9/2014 | Buelow | G02B 6/2808 398/143 |
| 2015/0030325 | A1* | 1/2015 | Chang | H04J 14/04 398/44 |
| 2015/0043910 | A1* | 2/2015 | Koebele | H04J 14/04 398/44 |
| 2015/0117860 | A1* | 4/2015 | Braun | H04J 14/0282 398/58 |
| 2015/0229438 | A1* | 8/2015 | Le Taillandier De Gabory | H04B 10/2581 398/182 |
| 2016/0056911 | A1* | 2/2016 | Ye | H04L 49/00 398/49 |
| 2016/0337727 | A1* | 11/2016 | Graves | H04Q 11/0005 |

* cited by examiner

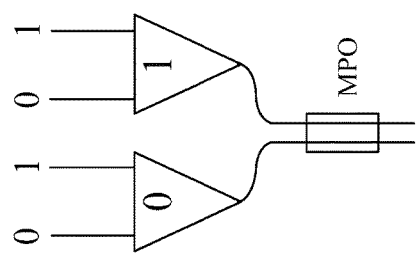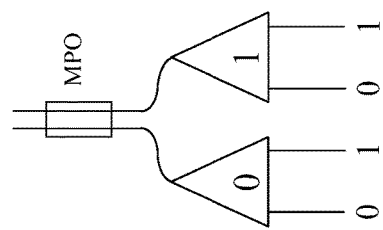

ARRAYED WAVEGUIDE GRATING BASED MULTI-CORE AND MULTI-WAVELENGTH SHORT-RANGE INTERCONNECTION NETWORK

CROSS-REFERENCE TO RELATED APPLICATION

The subject application claims priority on Chinese application no. 201711054631.1 filed on Nov. 1, 2017. The contents and subject matter of the Chinese priority application are incorporated herein by reference.

FIELD OF INVENTION

The present invention relates to an optical interconnection network, particularly, a multi-core and multi-wavelength short-range interconnection network that is based on Arrayed Waveguide Grating (AWG).

BACKGROUND ART

With the advent of the big data epoch, a large quantity of broadband applications and information consumption have emerged, which brings forward new demand for transport, storage, and computation of massive information. Data centers have played a decisive role and as part of the infrastructure of the information society for meeting the demand. Explosive growth of network information drives data centers to develop along direction of super-large size. However, traditional wiring method of direct linking in-between device ports has made wiring in-between switches in super-large data centers extremely complicated.

Complicated and long wiring incurs huge difficulty for system maintenance. Firstly, system maintenance would be extremely difficult in case of change of network connection or of invalid lines. Secondly, dense wiring impacts heat dissipation for racks, as reported by IBM. The Cisco white book further points out that wiring impacts scalability and power consumption of the system, which has become an industry-wide acknowledged bottleneck. Thus, it has become an important research topic to find means for reducing wiring complexity in meeting requirements of ever expanding data centers.

Currently, means for reducing wiring complexity in the industry are divided into the following:

(1) Wireless-Based Wiring

Wireless-based wiring mainly substitutes wireless links for wired links of part or all devices. Such a wiring mechanism poses many problems in actual applications. Firstly, rates of wireless links are far from meeting broadband requirements of the links. Secondly, weak capability of the wireless channels in anti-interference requires extra precision regulating mechanism to prevent interference among the channels, which results in poor device scalability. Thirdly, wireless stations have high power consumption.

(2) Wavelength Division Multiplexing (WDM) Based Wiring

The method uses WDM ring networks to realize logically full wiring among racks, with each pair of the wavelengths corresponding to a pair of racks. The method appears to simplify the network structure and wiring complexity, but in reality, connection to N ToRs would require $O(N^2)$ wavelengths. When faced with a scale of tens of thousands of racks, billions of wavelengths would be required, showing that the method has poor scalability.

(3) Arrayed Waveguide Grating (AWG) Based Modularized Interconnection Wiring

AWG based modularized interconnection wiring mainly uses optical fiber wavelength division multiplexing (WDM) techniques and AWG wavelength routing capacity for reducing wiring complexity. An N×N AWG interconnection network is constructed via a three-level network consisting of $(N/r)^2$ interconnected r×r AWGs, with wiring number being reduced to $O(N^2/r)$. Hence, the employment of AWG modularized interconnection networks in data center networks reduces wiring number while at the mean time provides sufficient communication bandwidth. However, as the scale of the data center further increases, the number of ports r of the r×r AWGs increases, which still results in scalability issues: firstly, the requirement of the networks for a large number of optical terminals with various wavelengths leads to high cost for system deployment; secondly, the AWGs with many ports produce substantial intraband crosstalk; thirdly, the difficulty of AWG processing increases.

SUMMARY OF THE INVENTION

To solve the wiring problems of the super-large data centers, the present invention provides an AWG based multi-core and multi-wavelength short-range interconnection network for further enhancing scalability of the AWG internetwork. An object of the present invention is to solve the problems of the wiring complexity and scalability of a super-large data center and to provide a multi-core and multi-wavelength short-range interconnection network that is based on arrayed waveguide grating for reducing network wiring complexity and enhancing scalability of the AWG based interconnected system.

The present invention discloses a multi-core and multi-length short-range interconnection network that is based on arrayed waveguide grating and applicable for a wavelength set of $\Lambda=\{\lambda_0, \lambda_1, \ldots, \lambda_{k-1}\}$, which comprises N upper-level switches labeled as $u_0, u_1, \ldots, u_{N-1}$, N lower-level switches labeled as $v_0, v_1, \ldots, v_{N-1}$, and a network intermediate stage, with each upper-level switch and lower-level switch both having N CWDM optical transceiving modules, the N optical transceiving modules of each upper-level switch being connected with n m×1 multi-core optical multiplexing modules, the N optical transceiving modules of each lower-level switch being connected with n 1×m multi-core demultiplexing modules, the network intermediate stage being comprised of $n^2$ r×r multi-core and multi-wavelength wiring modules, the upper-level multi-core optical multiplexing modules, the lower-level multi-core demultiplexing modules, and the $n^2$ r×r multi-core and multi-wavelength wiring modules of the network intermediate stage being connected via an m-core MPO-MPO optical fiber jumper; wherein r=mk, k being a number of wavelengths of the wavelength set $\Lambda$, m being a number of jumpers of the MPO-m core optical fiber branch jumpers;

The $n^2$ r×r multi-core and multi-wavelength wiring modules are constructed via the MPO-m core optical fiber branch jumpers and $m^2$ k×kAWGs, wherein k being the number of wavelengths of the wavelength set $\Lambda$, each r×r multi-core and multi-wavelength wiring module comprising r upper ports constituted of r MPO multi-core optical fiber connectors, the intermediate stage constituted of $m^2$ k×kAWGs, and r lower ports constituted of r MPO multi-core optical fiber connectors, the upper ports, the lower ports and the intermediate stage being connected via the MPO-m core optical fiber branch jumpers; wherein r=mk, k being the number of wavelengths of the wavelength set Λ, m being the number of jumpers of the MPO-m core optical fiber branch jumpers;

each m×1 multi-core optical multiplexing module connects each output port of m identical k×1 optical multiplexors to a same MPO-m core optical fiber branch jumper, with the dth k×1 optical multiplexor being connected with the dth core of the MPO-m core optical fiber branch jumper, wherein d=0, 1, . . . , m−1, each k×1 optical multiplexor being correlated with the wavelength set Λ={$\lambda_0$, $\lambda_1$, . . . , $\lambda_{k-1}$}, an input port p being correlated with a wavelength $\lambda_p$, wherein p=0, 1, . . . , k−1;

each 1×m multi-core optical demultiplexing module connects each input port of m identical 1×k optical demultiplexors to a same MPO-m core optical fiber branch jumper, with the cth 1×k optical multiplexor being connected with the cth core of the MPO-m core optical fiber branch jumper, wherein c=0, 1, . . . , m−1, each 1×k optical demultiplexor being correlated with the wavelength set Λ={$\lambda_0$, $\lambda_1$, . . . , $\lambda_{k-1}$}, an output port q being correlated with a wavelength $\lambda_q$, wherein q=0, 1, . . . , k−1.

The r×r multi-core and multi-wavelength wiring module of the intermediate stage is a three-level network module, with an intermediate stage of the module being constructed of $m^2$ identical k×kAWGs, each AWG being correlated with Λ={$\lambda_0$, $\lambda_1$, . . . , $\lambda_{k-1}$}, each k×kAWG being labeled with a number, with the c×m+dth AWG being labeled as B(c,d), wherein c, d=0, 1, . . . m−1, the ports of the module and the k×kAWGs being connected via the MPO-m core optical fiber branch jumpers. The dth core of the MPO-m core optical fiber branch jumper of the αth upper port is connected with the γth upper port of B(c,d), the cth core of the MPO-m core optical fiber branch jumper of the βth lower port is connected with the δth lower port of B(c,d), wherein c=[α/k], d=[β/k], γ=[α]$_k$, and δ=[β]$_k$.

The N×N multi-core and multi-length short-range interconnection network is a three-level network. The internetwork intermediate stage is comprised of $n^2$ r×r multi-core and multi-wavelength wiring modules. Each r×r multi-core and multi-wavelength wiring module is labeled with a number, with the a×n+bth r×r multi-core and multi-wavelength wiring module being labeled as A(a,b), wherein a=[i/r], b=[j/r], the bth m×1 multi-core optical multiplexing module of the ith upper-level switch $u_i$ being connected via an m core MPO-MPO optical fiber jumper with an upper port α of A(a,b), a lower port β of A(a,b) being connected via an m core MPO-MPO optical fiber jumper with the αth 1×m multi-core optical demultiplexing module of the jth lower-level switch $v_1$, wherein α=[i]$_r$, β=[j]$_r$.

The CWDM optical transceiver module is an optical transceiver combining CWDM techniques with spacing of the channels of the optical transceiver being determined according to specific application scenarios;

An end of the MPO-m core optical fiber branch jumper is an MPO multi-core optical fiber connector, while the other end is m fiber branch splices, with each branch splice being a single-core fiber;

On either end of the m core MPO-MPO optical fiber jumper there is an MPO multi-core optical fiber connector, with the two MPO multi-core optical fiber connectors being connected via m optical fibers;

The m×1 multi-core optical multiplexing module comprises m k×1 optical multiplexors which are connected to the same MPO-m core optical fiber branch jumper;

The 1×m multi-core optical demultiplexing module is comprised of m 1×k optical multiplexors which are connected to the same MPO-m core optical fiber branch jumper;

The k×kAWG is an arrayed waveguide grating having k input ports and k output ports, with each input port comprising k input wavelength channels, each output port comprising k output wavelength channels;

The r×r multi-core and multi-wavelength wiring module is an encapsulated standard module comprising r MPO multi-core optical fiber connectors constituting as r upper ports, $m^2$ k×kAWGs constituting as an intermediate stage, wherein r=mk, and r MPO multi-core optical fiber connectors constituting as r lower ports; the upper ports, the lower ports, and the intermediate stage are connected via the MPO-m core optical fiber branch jumpers; when k=1, m=r, then the k×kAWG degenerates into a single wavelength fiber wire, and the r×r multi-core and multi-wavelength wiring module becomes a r×r core single wavelength wiring module;

The N×N multi-core and multi-length short-range interconnection network based on AWG comprises N upper-level switches and N lower-level switches, wherein N=nr=nmk, each upper-level switch and lower-level switch both having N CWDM optical transceiving modules, the N optical transceiving modules of each upper-level switch being connected with n m×1 multi-core optical multiplexing modules, the N optical transceiving modules of each lower-level switch being connected with n 1×m multi-core demultiplexing modules, the network intermediate stage being comprised of $n^2$ r×r multi-core and multi-wavelength wiring modules, the upper-level multi-core optical multiplexing modules, the lower-level multi-core demultiplexing modules, and the r×r multi-core and multi-wavelength wiring modules of the network intermediate stage being connected via m-core MPO-MPO optical fiber jumpers.

In comparison with the prior art, the present invention is advantageous in that:

Employment of $n^2$ r×r multi-core and multi-wavelength wiring modules in construction of the N×N interconnection network, wherein N=nr=nmk, reduces the number of the AWG ports required by the interconnection network to be r/m, while guaranteeing the wiring complexity of the interconnection network to be $O(N^2/r)$ at the mean time, thus reducing the number of wavelengths required by the system to be only r/m, conserving on wavelength resource of the communication windows, and reducing cost for constructing an AWG based interconnection network.

BRIEF DESCRIPTION OF THE DRAWINGS

FIG. 6 is a schematic diagram showing a 2×1 multi-core optical multiplexing module of the present invention.

FIG. 7 is a schematic diagram showing a 1×2 multi-core optical demultiplexing module of the present invention.

DETAILED DESCRIPTION OF THE INVENTION AND EMBODIMENTS

The present invention is expounded in details with the figures and embodiments hereunder provided. The embodiments are meant to enunciate the present invention, but not to limit the scope of the present invention. A person of the art may modify the present invention in various equivalent forms after perusal of the present invention, all of which still fall within the scope of the claims of the present invention.

Figure 2:
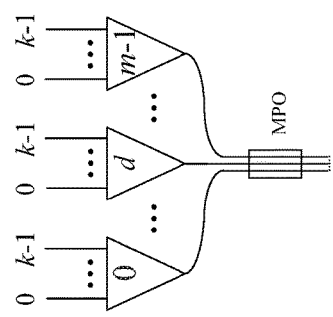
FIG. 2 is a schematic diagram showing a m×1 multi-core optical multiplexing module of the present invention.
Figure 3:
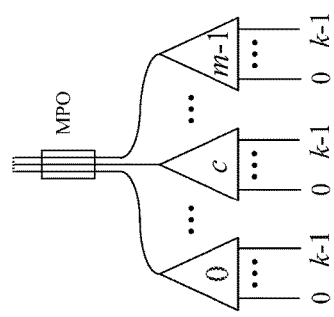
FIG. 3 is a schematic diagram showing a 1×m multi-core optical demultiplexing module of the present invention.
Figure 4:
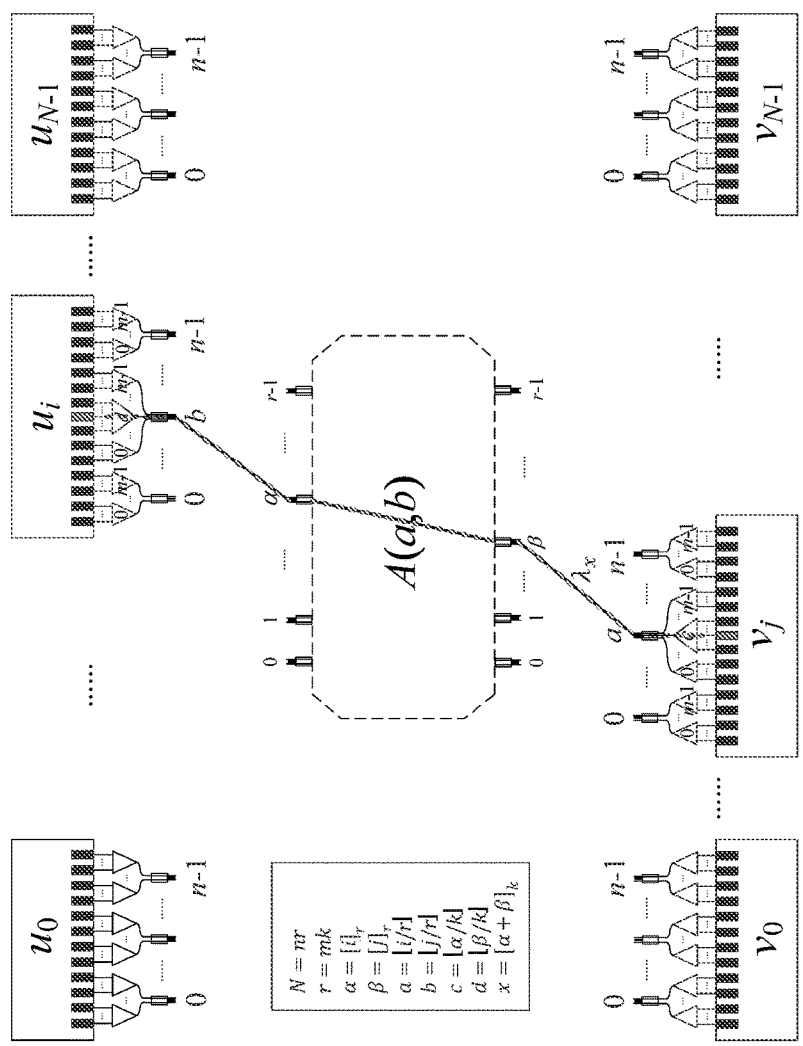
FIG. 4 is a schematic diagram showing an N×N multi-core and multi-length short-range interconnection network based on AWG of the present invention.

As shown in FIG. 4, a schematic diagram of an N×N multi-core and multi-length short-range interconnection network based on AWG of the present invention, am AWG-based multi-core and multi-length short-range interconnection network that is applicable for a wavelength set of $\Lambda=\{\lambda_0, \lambda_1, \ldots, \lambda_{k-1}\}$ of the present invention comprises N upper-level switches, N lower-level switches, and a network intermediate stage, with each upper-level switch and lower-level switch both having N CWDM optical transceiving modules, the N optical transceiving modules of each upper-level switch being connected with n m×1 multi-core optical multiplexing modules (as shown in FIG. 2), the N optical transceiving modules of each lower-level switch being connected with n 1×m multi-core demultiplexing modules (as shown in FIG. 3), the network intermediate stage being comprised of $n^2$ r×r multi-core and multi-wavelength wiring modules, the upper-level multi-core optical multiplexing modules, the lower-level multi-core demultiplexing modules, and the $n^2$ r×r multi-core and multi-wavelength wiring modules of the network intermediate stage being connected via m-core MPO-MPO optical fiber jumpers; wherein r=nk, k being a number of wavelengths of the wavelength set $\Lambda$, m being a number of jumpers of the MPO-m core optical fiber branch jumpers.

Figure 1:
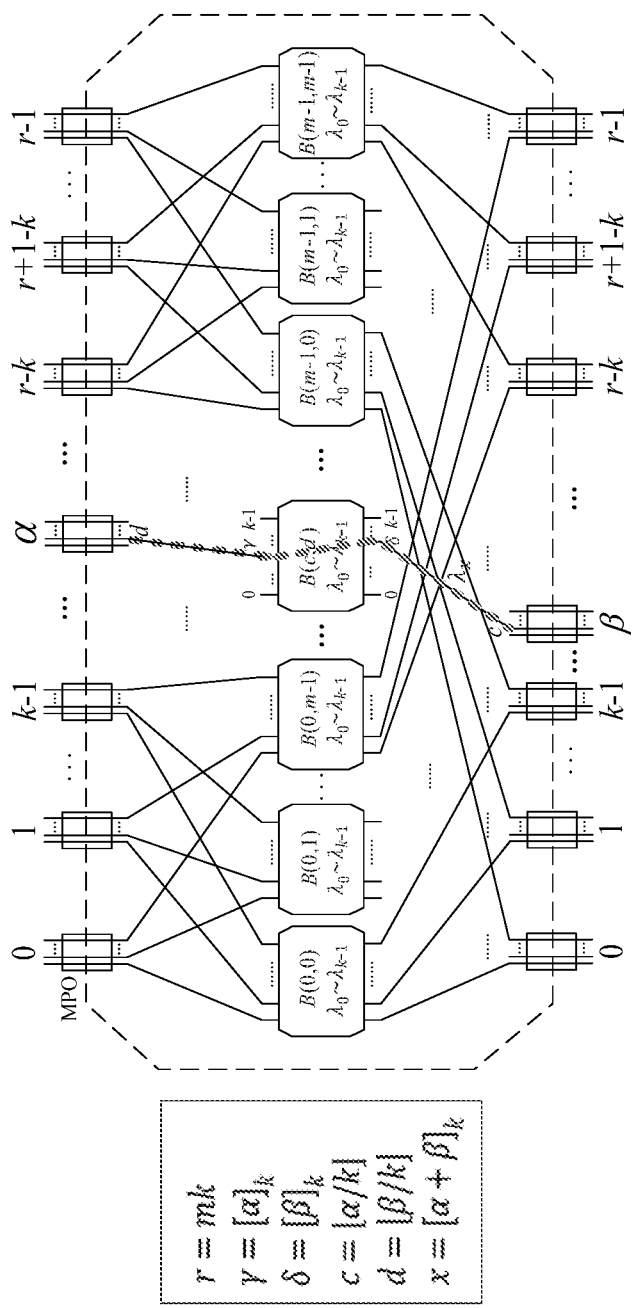
FIG. 1 is a schematic diagram showing a r×r multi-core and multi-wavelength wiring module of the present invention.

The $n^2$ r×r multi-core and multi-wavelength wiring modules are constructed via the MPO-m core optical fiber branch jumpers and $m^2$ k×kAWGs, wherein k being the number of wavelengths of the wavelength set $\Lambda$, each r×r multi-core and multi-wavelength wiring module (as shown in FIG. 1) comprising r upper ports comprising r MPO multi-core optical fiber connectors, the intermediate stage constituted of $m^2$ k×kAWGs, and r lower ports comprising r MPO multi-core optical fiber connectors, the upper ports, the lower ports, and the intermediate stage being connected via the MPO-m core optical fiber branch jumpers; wherein r=mk, k being the number of wavelengths of the wavelength set $\Lambda$, m being the number of jumpers of the MPO-m core optical fiber branch jumpers;

the m×1 multi-core optical multiplexing module connects each output port of m identical k×1 optical multiplexors to the same MPO-m core optical fiber branch jumper, with the dth k×1 optical multiplexor being connected with the dth core of the MPO-m core optical fiber branch jumper, wherein d=0, 1, ..., m−1, each k×1 optical multiplexor being correlated with the wavelength set $\Lambda=\{\lambda_0, \lambda_1, \ldots, \lambda_{k-1}\}$, the input port p being correlated with a wavelength $\lambda_p$, wherein p=0, 1, ..., k−1;

the 1×m multi-core optical demultiplexing module connects each input port of m identical 1×k optical demultiplexors to the same MPO-m core optical fiber branch jumper, with the cth 1×k optical multiplexor being connected with the cth core of the MPO-m core optical fiber branch jumper, wherein c=0, 1, ..., m−1, each 1×k optical demultiplexor being correlated with the wavelength set $\Lambda=\{\lambda_0, \lambda_1, \ldots, \lambda_{k-1}\}$, the output port q being correlated with the wavelength $\lambda_q$, wherein q=0, 1 ..., k−1.

The r×r multi-core and multi-wavelength wiring module of the intermediate stage is a three-level network module, with the intermediate stage of the module being constructed of $m^2$ identical k×kAWGs, each AWG being correlated with $\Lambda=\{\lambda_0, \lambda_1, \ldots, \lambda_{k-1}\}$, each k×kAWG being labeled with a number, with the c×m+dth AWG being labeled as B(c,d), wherein c,d=0, 1, ... m−1, the ports of the module and the k×kAWGs being connected via the MPO-m core optical fiber branch jumpers. The dth core of the MPO-m core optical fiber branch jumper of the αth upper port is connected with the γth upper port of B(c,d), the cth core of the MPO-m core optical fiber branch jumper of the βth lower port is connected with the δth lower port of B(c,d), wherein c=[α/k], d=[β/k], γ=[α]$_k$, and δ=[β]$_k$.

Figure 5:
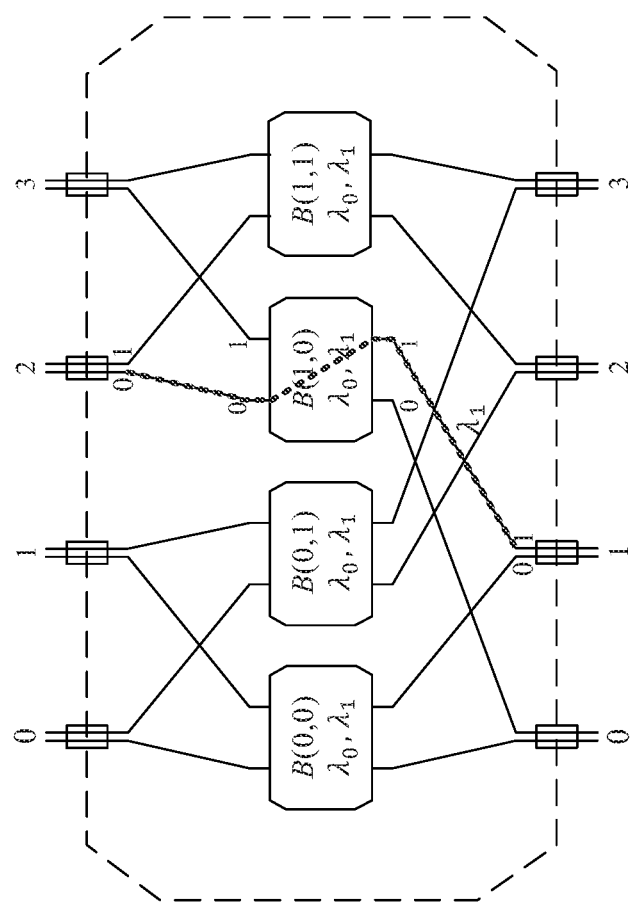
FIG. 5 is a schematic diagram showing a 4×4 multi-core and multi-wavelength wiring module of the present invention.
Figure 8:
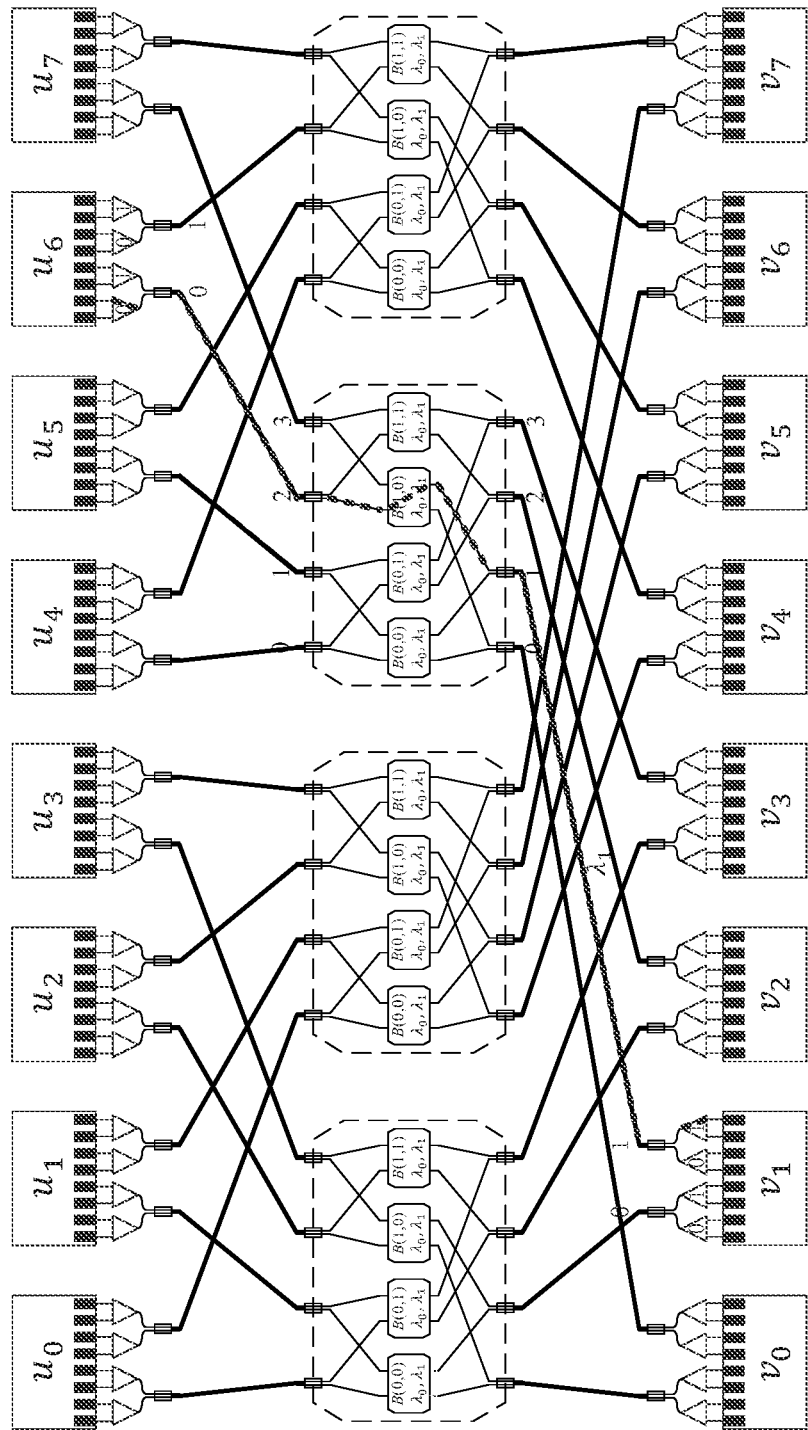
FIG. 8 is a schematic diagram showing an AWG-based 8×8 multi-core and multi-length short-range interconnection network as one embodiment of the present invention.

FIG. 8 is a schematic diagram showing an embodiment of the present invention. The embodiment, wherein r=4, m=2, k=2, and n=2, comprises the following constructing steps:

(1) constructing a 4×4 multi-core and multi-wavelength wiring module: as shown in FIG. 5, the module is an encapsulated standard module comprised of r=4 upper ports and r=4 lower ports, with the intermediate stage being comprised of $m^2=2^2=4$ identical 2×2AWGs, each AWG being correlated with the wavelength set $\{\lambda_0, \lambda_1\}$. The c×m+dth 2×2AWG is labeled as B(c,d), wherein c,d=0, 1. The ports of the module and the 2×2AWGs are connected via the MPO-2 core optical fiber branch jumpers. The dth core of the MPO-2 core optical fiber branch jumper of the αth upper port is connected with the γth upper port of B(c,d), the cth core of the MPO-2 core optical fiber branch jumper of the βth lower port is connected with the δth lower port of B(c,d), wherein c=[α/k]=[α/2], d=[β/k]=[β/2], γ=[α]$_k$=[α]$_2$, and δ=[β]$_k$=[β]$_2$. For example, B(1,0) is the c×m+d=1×2+0=2th 2×2AWG of the multi-core and multi-wavelength wiring module. The d=[β/k]=[1/2]=0th core of the MPO-2 core optical fiber branch jumper of the α=2th upper port is connected with the γ=[α]$_k$=[2]$_2$=0th upper port of B(1,0), the c=[α/k]=[2/2]=1th core of the MPO-2 core optical fiber branch jumper of the β=1th lower port is connected with the δ=[β]=[1]$_2$=1th lower port of B(1,0);

(2) constructing the 2×1 multi-core optical multiplexing module: connecting each output port of m=2 identical 2×1 optical multiplexors to the same MPO-2 core optical fiber branch jumper, with the dth 2×1 optical multiplexor being connected with the dth core of the MPO-2 core optical fiber branch jumper, wherein d=0, 1, as shown in FIG. 6, each 2×1 optical multiplexor being correlated with the wavelength set $\{\lambda_0, \lambda_1\}$, the input ports 0 and 1 of the 2×1 optical multiplexor being correlated respectively with the wavelengths $\lambda_0$ and $\lambda_1$;

(3) constructing the 1×2 multi-core optical demultiplexing module: connecting each input port of m=2 identical 1×2 optical multiplexors to the same MPO-2 core optical fiber branch jumper, with the cth 1×2 optical multiplexor being connected with the cth core of the MPO-2 core optical fiber branch jumper, wherein c=0, 1, as shown in FIG. 7, each 1×2 optical demultiplexor being correlated with the wavelength set $\{\lambda_0, \lambda_1\}$, the output ports 0 and 1 of the 1×2 optical demultiplexor being correlated respectively with the wavelengths $\lambda_0$ and $\lambda_1$;

(4) constructing the 8×8 multi-core and multi-length short-range interconnection network based on AWG: as shown in FIG. 8, the network comprises N=8 upper-level switches labeled as $u_0, u_1, \ldots, u_7$, N=8 lower-level switches labeled as $v_0, v_1, \ldots, v_7$. Each upper-level switch and lower-level switch both has N=8 CWDM optical transceiving modules, spacing of the channels of the optical transceiver being determined according to specific application scenarios. The 8 optical transceiving modules of each upper-level switch being connected with n=2 2×1 multi-core optical multiplexing modules, the 8 optical transceiving modules of each lower-level switch being connected with n=2 1×2 multi-core demultiplexing modules, the network intermediate stage being comprised of $n^2=2^2=4$ 4×4 multi-core and multi-wavelength wiring modules. The a×n+bth multi-core and multi-wavelength wiring module is labeled as A(a,b), wherein a=[i/r]=[i/4], b=[j/r]=[j/4]. The bth 2×1 multi-core optical multiplexing module of the ith upper-level switch u is connected via a 2 core MPO-MPO optical fiber jumper with an upper port α of A(a,b), a lower port f of A(a,b) is connected via an 2 core MPO-MPO optical fiber jumper with the αth 1×2 multi-core optical demultiplexing module of the jth lower-level switch $v_j$, wherein $\alpha=[i]_r=[i]_4$, $\beta=[j]_r=[j]_4$. Connection of the upper-level switch with the lower-level switch is established via the wavelengths $\lambda_x$, wherein i, j=0, 1, . . . , 7, $\lambda_x \in \Lambda$, and $x=[\alpha+\beta]_k=[\alpha+\beta]_2$. For example, the a×n+b=1×2+0=2th multi-core and multi-wavelength wiring module is labeled as A(1,0). The b=[1/4]=0th 2×1 multi-core optical multiplexing module of the upper-level switch $u_6$ is connected via a 2 core MPO-MPO optical fiber jumper with an upper port α=2 of A(1,0), a lower port β=1 of A(1,0) is connected via an 2 core MPO-MPO optical fiber jumper with the a=[6/4]=1th 1×2 multi-core optical demultiplexing module of the lower-level switch $v_1$. Connection of the upper-level switch $u_6$ with the lower-level switch $v_1$ is established via the wavelengths $\lambda_x=\lambda_1$ ($x=[\alpha+\beta]_k=[2+1]_2=1$).

The embodiment of the present invention having the AWG-based 8×8 multi-core and multi-length short-range interconnection network employs MPO-2 core optical fiber branch jumpers and 2×2AWGs with fewer ports to construct the 4×4 multi-core and multi-wavelength wiring modules, and interconnects the 4×4 multi-core and multi-wavelength wiring modules to construct the 8×8 interconnection network. In the embodiment, in contrast to the prior art AWG wiring schemes mentioned in the present invention, the present invention further reduces the AWG scale in half, under the same prerequisite of reduction of the network wiring complexity in half, thus conserving half of the wavelength resources.

We claim:

1. An array-waveguide grating (AWG) based multi-core and multi-length short-range interconnection network based for a wavelength set of $\Lambda=\{\lambda_0, \lambda_1, \ldots, \lambda_{k-1}\}$, comprising
   N number of upper-level switches,
   N number of lower-level switches, and
   a network intermediate stage,
   wherein each of the upper-level switches and each of the lower-level switches has N number of CWDM optical transceiving modules,
   the N optical transceiving modules of each of the upper-level switches is connected with n number of m×1 multi-core optical multiplexing modules,
   the N optical transceiving modules of each of the lower-level switches is connected with n number of 1×m multi-core demultiplexing modules,
   the network intermediate stage comprises $n^2$ number of r×r multi-core and multi-wavelength wiring modules,
   the n number of the multi-core optical multiplexing modules of the upper-level switches, the n number of the multi-core demultiplexing modules of the lower-level switches, and the $n^2$ number of the r×r multi-core and multi-wavelength wiring modules of the network intermediate stage are connected via m-core MPO-MPO optical fiber jumpers, wherein r=mk, k is a number of wavelengths of the wavelength set Λ, m is a number of the jumpers of the MPO-m core optical fiber branch jumpers;
   the $n^2$ number of the r×r multi-core and multi-wavelength wiring modules are constructed via the MPO-m core optical fiber branch jumpers and $m^2$ number of k×kAWGs;
   each r×r multi-core and multi-wavelength wiring module comprises r number of upper ports having r number of MPO multi-core optical fiber connectors, the intermediate stage having $m^2$ number of k×kAWGs, and r number of lower ports having r number of MPO multi-core optical fiber connectors; wherein the upper ports, the lower ports, and the intermediate stage are connected via the MPO-m core optical fiber branch jumpers, wherein r=mk, k is the number of wavelengths of the wavelength set Λ, m is the number of the jumpers of the MPO-m core optical fiber branch jumpers;
   each m×1 multi-core optical multiplexing module connects each output port of m identical k×1 optical multiplexors to a same MPO-m core optical fiber branch jumper, with the dth k×1 optical multiplexor being connected with the dth core of the MPO-m core optical fiber branch jumper, wherein d=0, 1, . . . , m−1, each k×1 optical multiplexor being correlated with the wavelength set $\Lambda=\{\lambda_0, \lambda_1, \ldots, \lambda_{k-1}\}$, an input port p of the k×1 optical multiplexor being correlated with a wavelength $\lambda_p$, and p=0, 1, . . . , k−1; and
   each 1×m multi-core optical demultiplexing module connects each input port of m identical 1×k optical demultiplexors to a same MPO-m core optical fiber branch jumper, with the cth 1×k optical multiplexor being connected with the cth core of the MPO-m core optical fiber branch jumper, wherein c=0, 1, . . . , m−1, each 1×k optical demultiplexor being correlated with the wavelength set $\Lambda=\{\lambda_0, \lambda_1, \ldots, \lambda_{k-1}\}$, an output port q of the 1×k optical demultiplexor being correlated with a wavelength $\lambda_q$, and q=0, 1, . . . , k−1.

2. The AWG-based multi-core and multi-length short-range interconnection network as described in claim 1, wherein the r×r multi-core and multi-wavelength wiring module of the intermediate stage is a three-level network module, the three-level module has an intermediate stage being constructed of $m^2$ number of identical k×kAWGs,
   each AWG is correlated with $\Lambda=\{\lambda_0, \lambda_1, \ldots, \lambda_{k-1}\}$, each k×k AWG is labeled with a number, with the c×m+dth AWG being labeled as B(c,d), c,d=0, 1, . . . m−1, and
   the ports of the module and the k×kAWGs are connected via the MPO-m core optical fiber branch jumpers; the dth core of the MPO-m core optical fiber branch jumper of the αth upper port is connected with the γth upper port of B(c,d), the cth core of the MPO-m core optical fiber branch jumper of the βth lower port is connected with the δth lower port of B(c,d), and c=[a/k], d=[β/k], $\gamma=[\alpha]_k$, and $\delta=[\beta]_k$.

3. The AWG-based N×N multi-core and multi-length short-range interconnection network as described in claim 1, wherein the N×N multi-core and multi-length short-range interconnection network is a three-level network having an intermediate stage;
   the intermediate stage of the three-level network comprises $n^2$ number of r×r multi-core and multi-wavelength wiring modules; each r×r multi-core and multi-wavelength wiring module is labeled with a number, with the a×n+bth r×r multi-core and multi-wavelength wiring module being labeled as A(a,b), wherein a=[i/r], b=[j/r], the bth m×1 multi-core optical multiplexing module of the ith upper-level switch $u_i$ is connected via an m core MPO-MPO optical fiber jumper with an upper port α of A(a,b), a lower port β of A(a,b) is connected via an m core MPO-MPO optical fiber jumper with the αth 1×m multi-core optical demultiplexing module of the jth lower-level switch $r_j$, and α=$[i]_r$, β=$[j]_r$.

* * * * *